United States Patent
Oki et al.

(10) Patent No.: US 7,833,931 B2
(45) Date of Patent: Nov. 16, 2010

(54) SOLID ACID CATALYST FOR PRODUCTION OF POLYESTER, PROCESS FOR PRODUCTION OF THE CATALYST, AND PROCESS FOR PRODUCTION OF POLYESTER USING THE CATALYST

(75) Inventors: Hironobu Oki, Sakura (JP); Kouji Shiraishi, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/532,885

(22) PCT Filed: Mar. 24, 2008

(86) PCT No.: PCT/JP2008/055397

§ 371 (c)(1),
(2), (4) Date: Sep. 24, 2009

(87) PCT Pub. No.: WO2008/117769

PCT Pub. Date: Oct. 2, 2008

(65) Prior Publication Data

US 2010/0105858 A1    Apr. 29, 2010

(30) Foreign Application Priority Data

Mar. 27, 2007 (JP) .............................. 2007-081386

(51) Int. Cl.
*B01J 23/10* (2006.01)
*C08G 63/02* (2006.01)

(52) U.S. Cl. ..................... 502/308; 528/176; 528/271; 528/272; 528/279

(58) Field of Classification Search .................. 502/60, 502/64, 66, 71, 80, 308; 528/176, 271, 272, 528/279
See application file for complete search history.

(56) References Cited

U.S. PATENT DOCUMENTS

| 5,773,648 | A | 6/1998 | Becker et al. | |
|---|---|---|---|---|
| 6,043,338 | A | 3/2000 | Sigwart et al. | |
| 6,224,748 | B1 | 5/2001 | Chang et al. | |
| 6,355,852 | B1 * | 3/2002 | Bricker et al. | ............... 585/470 |
| 6,512,109 | B1 | 1/2003 | Nishimura | |
| 7,211,681 | B2 * | 5/2007 | Furuta | ........................ 554/174 |
| 2006/0216623 | A1 | 9/2006 | Matsumura et al. | |

FOREIGN PATENT DOCUMENTS

| JP | 01-288339 A | 11/1989 |
|---|---|---|
| JP | 05-293375 A | 11/1993 |
| JP | 09-501867 | 2/1997 |
| JP | 10-506137 | 6/1998 |
| JP | 11-510529 | 9/1999 |
| JP | 2000-119389 A | 4/2000 |
| JP | 2004-075787 A | 3/2004 |
| JP | 2005-118714 A | 5/2005 |
| JP | 2006-265416 A | 10/2006 |

OTHER PUBLICATIONS

International Search Report mailed May 20, 2008, issued on PCT/JP2008/055397.

* cited by examiner

*Primary Examiner*—Terressa M Boykin
(74) *Attorney, Agent, or Firm*—Edwards Angell Palmer & Dodge LLP (57) ABSTRACT

The present invention relates to a solid acid catalyst for the production of polyester which enables the production of a metal-free polyester resin containing no residual catalyst, exhibits favorable utility efficiency in the production, exhibits extremely high selectivity for the polyesterification reaction with the amount of by-products being below the limit of detection, and is able to be isolated, recovered and reused. In other words, the present invention relates to a solid acid catalyst for the production of polyester, obtained by supporting a metal oxide (B) on a support (A) formed from a metal oxide, wherein said support (A) formed from a metal oxide is a zirconia, said metal oxide (B) is a molybdenum oxide, and a Hammett acidity function ($H_0$) for said catalyst is within a range from −3 to −9, and also relates to a process for producing the solid acid catalyst and a process for producing a polyester that uses the catalyst.

10 Claims, 3 Drawing Sheets

SOLID ACID CATALYST FOR PRODUCTION OF POLYESTER, PROCESS FOR PRODUCTION OF THE CATALYST, AND PROCESS FOR PRODUCTION OF POLYESTER USING THE CATALYST

TECHNICAL FIELD

The present invention relates to a solid acid catalyst for the production of polyester, a process for the production of the catalyst, and a process for the production of polyester that uses the catalyst, and relates more specifically to a solid acid catalyst for the production of a polyester by performing a dehydration condensation reaction of a polyhydric alcohol and a polyvalent carboxylic acid, a process for the production of the catalyst, and a process for the production of polyester that uses the catalyst.

BACKGROUND ART

Currently, the synthesis of polyester resins in the chemical industry is conducted using a titanium-based or tin-based homogeneous catalyst. Because this type of homogeneous catalyst blends completely into the resin, removal of the catalyst by isolation and recovery is difficult, and synthesizing a polyester that contains no residual catalyst is extremely problematic. This residual catalyst promotes reaction between ester bonds and moisture that exists within the polyester resin, causing hydrolysis, and therefore tends to cause a deterioration in the durability and storage stability of the polyester resin. Moreover, this residual catalyst within the polyester resin also tends to participate in the reaction during production of a urethane resin using the generated polyester polyol and an isocyanate, and because the catalyst tends to increase the reactivity, controlling the reactivity becomes difficult. Accordingly, there are currently considerable demands for catalyst-free polyester polyols that contain none of the above type of residual catalyst within the polyester polyol.

Because of the problems outlined above, the amount of a homogeneous catalyst that can be used is usually restricted to a very small amount, and as a result, polyester production requires a considerable length of time. Moreover, because isolation and recovery of the catalyst is problematic, some coloration of the polyester and an effect on the physical properties of the polyester are unavoidable.

Accordingly, a technique has been proposed in which a high-activity organic acid-based catalyst formed from an organometallic compound is used in a small amount to accelerate the esterification reaction (for example, see Patent Document 1). However, in this proposal, because there is still a limit on the amount of catalyst used, a satisfactory amount of the catalyst cannot be applied, meaning a dramatic shortening of the production time cannot be expected.

Furthermore, a technique that uses a solid acid catalyst as a polyester polymerization co-catalyst has also been proposed (see Patent Document 2), but the zirconia molybdate that is used in this patent application has an $H_0$ function of $-12.4$, and is therefore a so-called "superacid". However, if this type of solid superacid is used in a dehydration condensation reaction with a glycol and an acid, then because the acid strength is too high, side reactions such as an etherification that proceeds via a glycol dehydration tend to occur, meaning the technique is unsuited to industrial use due to selectivity problems (see example 6 and comparative example 1 of Patent Document 2).

Patent Document 1:
Japanese Unexamined Patent Application, First Publication No. 2005-118714
Patent Document 2:
Japanese Unexamined Patent Application, First Publication No. 2006-265416

DISCLOSURE OF INVENTION

Problems to be Solved by the Invention

An object of the present invention is to provide a solid acid catalyst for the production of polyester which enables the production of a metal-free polyester resin containing no residual catalyst, exhibits favorable utility efficiency in the production, exhibits extremely high selectivity for the polyesterification reaction with the amount of by-products being below the limit of detection, and is able to be isolated, recovered and reused, and also to provide a process for producing the solid acid catalyst and a process for producing a polyester that uses the catalyst.

Means to Solve the Problems

As a result of performing intensive research aimed at developing a solid acid catalyst for the production of polyester resin capable of achieving the above object, the inventors of the present invention discovered that in the production of a polyester resin using a dehydration condensation reaction between a polyvalent carboxylic acid and a polyhydric alcohol, the above object could be achieved by using a specific solid acid catalyst as the solid acid catalyst for the production of polyester, and they were therefore able to complete the present invention.

In other words, the present invention provides: a solid acid catalyst for the production of polyester, obtained by supporting a metal oxide (B) on a support (A) formed from a metal oxide, wherein the support (A) formed from a metal oxide is a zirconia, the metal oxide (B) is a molybdenum oxide, and the Hammett acidity function ($H_0$) is within a range from $-3$ to $-9$; and a process for producing a solid acid catalyst for the production of polyester by supporting a metal oxide (B) on a support (A) formed from a metal oxide, wherein in producing a solid acid catalyst in which the support (A) formed from a metal oxide is a zirconia and the metal oxide (B) is a molybdenum oxide, the calcination temperature is within a range from 673 K to 1,473 K. The present invention also provides a process for producing a polyester or unsaturated polyester that includes supplying a polyhydric alcohol (D) and a polyvalent carboxylic acid (E) to a fixed bed circulating reactor, circulating fluidized bed reactor or batch reactor containing the above solid acid catalyst for the production of polyester, and conducting a dehydration condensation reaction.

EFFECT OF THE INVENTION

The solid acid catalyst of the present invention is a catalyst obtained by supporting a molybdenum oxide as a metal oxide (B) on a support (A) containing a zirconia, and by ensuring that the catalyst has a Hammett acidity function ($H_0$) within a range from $-3$ to $-9$, a polyester can be produced with good efficiency. The solid acid catalyst of the present invention is obtained by generating zirconia molybdate active sites on the zirconia support, wherein these active sites are generated at a specific calcination temperature to achieve the specific Hammett acidity function ($H_0$) mentioned above. It is thought that these catalytically active sites adsorb the polyhydric alcohol, and that the polyvalent carboxylic acid then makes contact with the adsorbed polyhydric alcohol, enabling the esterification reaction to proceed and the polyester to be obtained with favorable efficiency.

By conducting a polyesterification reaction using the specific solid acid catalyst of the present invention (hereafter also referred to as "the catalyst (C)" or "the solid acid catalyst (C)"), the following effects can be obtained.

(1) Because the catalyst (C) is a solid, separation of the catalyst and the polyester that represents the target product is simple, meaning the catalyst can be recovered and reused, and as a result, there is no limit on the amount of catalyst that may be used, meaning the catalyst can be used in a much larger amount than is permissible for conventional homogenous catalysts, thus improving the productivity, which is very advantageous from an industrial perspective.

(2) Because the catalyst (C) can be isolated following completion of the polyester synthesis, no residual catalyst remains within the polyester, meaning a metal-free polyester can be obtained.

(3) Because the condensation reaction can be conducted at a lower temperature than that achievable using conventional catalysts, the energy required in producing the polyester can be reduced.

BEST MODE FOR CARRYING OUT THE INVENTION

A more detailed description of the present invention is presented below.

The catalyst (C) of the present invention is a solid acid catalyst obtained by supporting a metal oxide (B) on the surface of a metal oxide support (A).

For reasons including ease of design of the catalyst, whether or not a satisfactory catalytic function can be achieved, and the solubility of the catalyst in the polyester or the raw material therefor, zirconia (zirconium dioxide, $ZrO_2$) is used as the metal oxide support (A). The zirconia may also be used in combination with silica ($SiO_2$), alumina ($Al_2O_3$), titania ($TiO_2$), tin oxides ($SnO_2$, $SnO$), hafnium oxide ($HfO_2$), iron oxides ($Fe_2O_3$, $Fe_3O_4$) or zeolites or the like. In those cases where a combination of this type is used, the zirconia content within the catalyst (C) is preferably a molar ratio of not less than 10%, and more preferably not less than 30%. If the zirconia content is less than this range, then dissolution of the catalyst (C) within the polyester resin becomes problematic, making the catalyst difficult to use as a solid acid catalyst for polyester production.

For reasons of catalyst design, molybdenum is used as the metal element of the metal oxide (B) supported on the support. The supported metal oxide (B) is a molybdenum oxide (such as molybdenum trioxide, $MoO_3$). Moreover, although molybdenum is used as the metal element for the supported metal oxide (B), other metal elements such as tungsten or tantalum may be used in combination with the molybdenum to form composite compounds. Examples of supported metal oxides that may be used in such composite compounds include tungsten oxides (such as $WO_3$) and tantalum oxides (such as $Ta_2O_5$).

The Mo/Zr ratio between the metal elements in the catalyst (C) of the present invention (wherein Mo represents molybdenum and Zr represents zirconium) is preferably a mass ratio within a range from 0.01 to 0.40. If the ratio is less than this range, then a sufficient amount of the zirconia molybdate that acts as the active sites for the reaction tends not to be formed, and an adequate catalytic action is not achieved. In contrast, if the ratio exceeds the above range, then the amount of supported molybdenum oxide is too large for the zirconia surface that acts as the support, meaning the molybdenum oxide is supported in multiple layers on the zirconia surface, and as a result, an adequate catalytic action cannot be achieved. For these reasons, the Mo/Zr mass ratio is preferably within a range from 0.1 to 0.2.

The catalyst (C) of the present invention can be produced, for example, by forming a reaction product (such as zirconia molybdate) of zirconium hydroxide and ammonium molybdate on the surface of a zirconia that bears grooves, holes or cracks or the like. In an example of the production method, ammonium molybdate that acts as a precursor to the supported metal oxide (B) is supported on zirconium hydroxide that acts as a precursor to the metal oxide support (A) using a conventional supporting method such as an equilibrium adsorption method, incipient wetness method or evaporation to dryness method, and the adsorbed mixture is then calcined. The calcination temperature is preferably within a range from 673 K to 1,473 K, and is more preferably from 973 K to 1,273 K. At temperatures outside this range, for example if the calcination temperature is lower than 673 K, molybdenum-oxygen-zirconium (Mo—O—Zr) bonds do not form satisfactorily, and the activity of the resulting catalyst may be inadequate, whereas if the calcination temperature exceeds 1,473 K, then the surface area decreases dramatically, meaning a satisfactory contact surface area with the reaction materials cannot be achieved, resulting in a significant reduction in the catalytic activity.

The acidity function is one of the numerical values that can be used to quantitatively represent the acid-base strength of a solution, and is a function that indicates the ability of a solution to donate hydrogen ions or accept hydrogen ions. For acids, the Hammett acidity function developed by Louis Hammett is the most commonly used acidity function, and represents the tendency of a solution to move a proton to a neutral base.

According to the Hammett acidity function, an electrically neutral base B in an aqueous solution bonds in the manner shown below.

$$B + H^+ \rightleftharpoons BH^+$$

If the acid dissociation constant for $BH^+$ is termed $pKBH^+$, the proportion of B that bonds to H+ when placed in solution is termed $CBH^+$, and the proportion of B that does not bond to $H^+$ is termed CB, then the Hammett acidity function ($H_0$) is represented by the equation below.

$$H_0 = -pKBH^+ + \log(CBH^+/CB)$$

The Hammett acidity function ($H_0$) for the catalyst (C) of the present invention is within a range from −3 to −9. In the same way that the acid-base strength of an aqueous solution is represented by pH, the Hammett acidity function ($H_0$) is an indicator that represents the strength of acid-base sites on a solid surface. In an aqueous solution, the Hammett acidity function is such that $pH = H_0$, and therefore it tends to be instinctively understood, and because the associated experimental operations are simple, this function is widely accepted. Lower values for $H_0$ indicate stronger acidity, whereas larger $H_0$ values indicate stronger basicity.

In the esterification reaction system of the present invention, if the acidity function ($H_0$) of the solid acid catalyst (C) of the present invention is greater than −3, then a satisfactory catalytic activity is not realized, and the esterification reaction proceeds poorly, meaning the catalyst cannot be used as a catalyst for polyester production. In contrast, if the acidity function ($H_0$) of the solid acid catalyst (C) of the present invention is less than −9, then there is an increased chance of side reactions occurring, including the generation of carbon-carbon double bonds via intramolecular dehydration of the glycol, and an etherification reaction of the thus generated double bonds with the glycol, and the catalyst is therefore unsuitable as a solid acid catalyst for polyester production.

<Method of Measuring the Hammett Acidity Function ($H_0$) by $NH_3$-TPD Measurement>

Measurement Method:

A 0.1 g sample of the solid acid catalyst was set in the quartz cell (internal diameter: 10 mm) of a temperature programmed desorption apparatus TPD-AT-1 manufactured by BEL Japan, Inc., and the temperature was raised to 423 K (150° C.) at 5 K $min^{-1}$ under a stream of helium gas (30 $cm^3$ $min^{-1}$, 1 atm) and then held at 423 K for 3 hours. Subsequently, with the helium gas stream maintained, the temperature was raised to 373 K (100° C.) at 7.5 K $min^{-1}$, the system was subjected to vacuum degassing, 100 Torr (1 Torr=1/760 atm=133 Pa) of $NH_3$ was introduced and allowed to undergo adsorption for 30 minutes, and the system was then evacuated for 12 minutes and subsequently subjected to a steam treatment. In the steam treatment, steam having a steam pressure of approximately 25 Torr (approximately 3 kPa) was introduced at 373 K, the system was held in that state for 30 minutes, the system was evacuated for 30 minutes, steam was re-introduced for a further 30 minutes, and then an evacuation was repeated again for 30 minutes. Subsequently, helium gas was supplied to the system at a rate of 0.041 mmol $s^{-1}$ (equivalent to 60 $cm^3$ $min^{-1}$ at 298 K, 25° C. and 1 atm) while a state of reduced pressure (100 Torr) was maintained, and after maintaining this state for 30 minutes at 373 K, the sample bed was heated to 983 K (710° C.) at 10 K $min^{-1}$, and the evacuated gas was analyzed using a mass spectrometer (ANELVA M-QA 100F).

During measurement, mass spectra were recorded for mass values (m/e) of 2, 4, 14, 15, 16, 17, 18, 26, 27, 28, 29, 30, 31, 32 and 44. Following completion of the measurements, a 1 mol % $NH_3$/He standard gas was further diluted with helium, and gas samples having ammonia gas concentrations of 0, 0.1, 0.2, 0.3 and 0.4 mol % were passed through the detector with the total flow rate set to 0.041 mmol $s^{-1}$, spectra were recorded, and an ammonia gas calibration curved was prepared and used to correct the detector strength. From the ammonia desorption TPD spectrum of each of the main mass spectra measured during the temperature programmed desorption, a one-point method based on the actual measurement results was used to determine the amount of acid from the peak surface area, and the average acid strength from the peak position and the like. The amount of acid and the acid strength ($\Delta H$) were calculated, and the acidity function ($H_0$) was then calculated.

The wettability of the surface of the solid acid catalyst (C) can be determined by using a penetration rate method to measure the contact angle with water for the catalyst surface. This wettability can be controlled by altering the calcination temperature during the production of the catalyst (C). Measurement of the wettability of the solid acid catalyst (C) using a penetration method was conducted using the powder wetting rate measurement option provided on a surface tensiometer K12 (manufactured by Krüss GmbH), and was measured using a method in which a 2.5 g sample (of the catalyst) was packed into a sample tube, and the penetration rate of a solvent through the sample was measured.

The factor was determined by assuming a contact angle of 0° for hexane, and the wetting rate for water was then used to measure the water contact angle. The calculation was performed using Washburn's equation shown below.

$$l=\sqrt{(r\gamma\cos\theta/2\eta)t}$$ [Numerical formula 1]

wherein l represents the penetration depth, r represents the capillary radius, η represents the viscosity, γ represents the liquid surface tension, θ represents the contact angle, and t represents the time.

When the average particle size of the catalyst is 1 μm, the contact angle with water, calculated from the rate at which the water penetrates into a column packed with the solid acid catalyst (C) (namely, a penetration rate method), is preferably within a range from 30 to 110° in terms of using the catalyst as a solid acid catalyst (C) for polyester production. A more preferred contact angle is within a range from 70 to 90°.

The reasons for restricting the solid acid catalyst (C) of the present invention to a contact angle mentioned above are because if the contact angle of the solid acid catalyst (C) with water is less than 30°, then it is thought that the water generated during the polyester synthesis tends to adsorb readily to the active sites on the catalyst surface, making it difficult for the raw material glycol and acid to reach the active sites on the catalyst surface, whereas if the contact angle exceeds 110°, then it is thought that it becomes difficult, not only for water, but also for the raw material glycol and acid, to reach the active sites on the catalyst surface. In contrast, if the catalyst surface exhibits a contact angle that falls within the above range, and particularly from 70 to 90°, then it is thought that because water is unlikely to adsorb to the catalyst surface, whereas the raw material glycol and acid adsorb readily to the active sites on the catalyst surface, the polyesterification reaction tends to proceed satisfactorily. As a result, it is thought that regulating the catalyst surface so that the contact angle satisfies the range described above yields an increase in the reaction rate.

The solid acid catalyst (C) exhibits a catalytic action on the reaction raw materials, and accelerates the polyesterification reaction. In other words, the polyhydric alcohol (D) and the polyvalent carboxylic acid (E) that represent the reaction raw materials undergo reaction via a process that involves adsorption to the active sites on the catalyst surface, reaction, and subsequent desorption. The active sites formed from the metal element-containing oxide (B) supported on the metal oxide support (A) are preferably formed at the surface of the solid acid catalyst (C), and because it is particularly desirable that catalytic activity manifests at the surface of the metal oxide support (A), the supported metal element-containing oxide (B) is preferably supported mainly at the surface of the metal oxide support (A).

Examples of the method used for supporting the metal oxide (B) on the metal oxide support (A) include an equilibrium adsorption method, incipient wetness method or evaporation to dryness method.

The equilibrium adsorption method is a method in which the metal oxide support (A) is immersed in a solution of the metal that is to be supported, and following adsorption of the metal, the excess solution is separated by filtration. The amount of supported material is determined by the solution concentration and the pore volume. The fact that the composition of the solution changes as the support is added can be problematic.

The incipient wetness method is a method in which following degassing of the metal oxide support (A), a solution of the metal to be supported having the same volume as the pore volume of the support is added gradually so as to achieve a state in which the surface of the metal oxide support (A) is wetted uniformly. The amount of the supported metal element is regulated by altering the solution concentration.

The evaporation to dryness method is a method in which following immersion of the metal oxide support (A) in the solution, the solvent is removed by evaporation, thereby supporting the solute on the support. A large amount of material can be supported using this method, but those metal components bonded weakly to the support tend to be concentrated during drying, and may form large metal particles following the reduction treatment.

Of these methods, the supporting method used is preferably selected with due consideration of the properties required of the catalyst, and in the case of the solid acid catalyst (C) of the present invention, the incipient wetness method and evaporation to dryness method are particularly preferred.

In an example of the method for producing the solid acid catalyst (C) of the present invention, a molybdenum compound and a zirconium compound are combined using one of the supporting methods described above, and a calcination treatment is then conducted, either in the air or under an atmosphere of He, Ne, Ar, $N_2$ or $O_2$ or the like, preferably at a temperature within a range from 673 K to 1,473 K. When selecting the molybdenum oxide and the zirconium compound, the compound to be supported must be selected with due consideration of the isoelectric point of the support surface. For example, ammonium molybdate (($NH_4$)$_6$ $Mo_7O_{24}$·$4H_2O$) is a preferred compound for the molybdenum compound, whereas zirconium hydroxide is an example of a preferred zirconium compound. The calcination treatment is preferably within a range from 673 K to 1,473 K. A calcination temperature from 773 K to 1,273 K is more preferred. If the calcination temperature is lower than 673 K, then molybdenum-oxygen-zirconium (Mo—O—Zr) bonds do not form satisfactorily, and the activity of the resulting catalyst may deteriorate. In contrast, if the calcination temperature exceeds 1,473 K, then the surface area decreases dramatically, meaning an adequate contact surface area with the reaction base materials cannot be achieved, resulting in a reduction in the catalytic activity. Moreover, based on evaluation of the wettability described above (namely, the hydrophobicity) and evaluation of the catalytic activity (in the examples), the most preferred calcination temperature range is from 973 K to 1,273 K.

The solid acid catalyst (C) of the present invention is a solid catalyst, and is insoluble in the liquid phase of the polyhydric alcohol (D) and the polyvalent carboxylic acid (E) that represent the esterification reaction raw materials. Furthermore, in the solid acid catalyst (C) of the present invention, if required, one or more other arbitrary elements may also be supported in combination. Examples of these other arbitrary elements include silicon, aluminum, phosphorus, tungsten, cesium, niobium, titanium, tin, silver, copper, zinc, chromium, tellurium, antimony, bismuth, selenium, iron, magnesium, calcium, vanadium, cerium, manganese, cobalt, iodine, nickel, lanthanum, praseodymium, neodymium, promethium, samarium, europium, gadolinium, terbium, dysprosium, holmium, erbium, thulium, ytterbium and lutetium.

Although there are no particular restrictions on the form of these arbitrarily supported metal oxides, particulate or cluster forms are preferred. Further, although there are no particular restrictions on the size of the microparticles of the metal oxide (B) supported on the support, particulate forms at the sub micron level or no more than the micron level are preferred, although individual particles may be associated or aggregated together.

Examples of the form of the solid acid catalyst (C) of the present invention include a powdered form, spherical particulate form, amorphous granular form, cylindrical pellet form, or an extruded shape or ring shape, although this is not an exhaustive list. Further, the catalyst may also have pores having a size of several angstroms or larger, and the reaction sites may be space-restricted sites inside these pores. Furthermore, although there are no particular limitations on the size of the solid acid catalyst (C), if due consideration is given to the fact that the catalyst (C) must be isolated and removed following completion of the polyester synthesis, the support (A) used in forming the catalyst (C) preferably has a comparatively large particle size. When a fixed bed circulating reactor is used during reaction, in those cases where the support (A) is spherical, if the particle diameter is extremely small, then a significant pressure loss is generated when circulating the reactants, and an effective circulation of the reactants may become impossible. In contrast, if the particle size is overly large, then the reaction raw materials are unable to make efficient contact with the solid acid catalyst (C), meaning the catalytic reaction may not proceed effectively. Accordingly, the size of the solid acid catalyst (C) is preferably determined in accordance with the size of the column packed with the catalyst and the optimal porosity. The average particle size of the solid acid catalyst (C), determined by a light scattering method (a Microtrac X100 apparatus) or a sieve screening method, is typically within a range from 1 μm to 1 cm, and is preferably from 10 μm to 10 mm. In an even more preferred configuration, the metal oxide (B) is supported in an egg shell arrangement (namely, supported on the outer layer) on a granular metal oxide support (A) having an average particle size within a range from 0.5 to 8 mm.

In the process for producing a polyester according to the present invention, a polyhydric alcohol (D) and a polyvalent carboxylic acid (E) are subjected to an esterification reaction in the presence of the solid acid catalyst (C). Examples of the polyester include a polyester resin, polyester polyol or unsaturated polyester. In terms of the apparatus used for the reaction, the polyhydric alcohol (D) and the polyvalent carboxylic acid (E) that represent the reaction raw materials are preferably supplied to, and subjected to a dehydration condensation reaction within, a circulating reactor or batch reactor packed with the catalyst (C). Moreover, in the production process of the present invention, the polyhydric alcohol (D) and the polyvalent carboxylic acid (E) are subjected to a dehydration condensation reaction in the presence of the solid acid catalyst (C), and the solid acid catalyst (C) is then removed once a predetermined molecular weight has been reached.

No special operations are required for removing the catalyst. For example, in those cases where a batch reactor is used, the catalyst can be removed by a simple filtration operation, whereas in those cases where a circulating reactor is used, even the filtration operation is unnecessary, meaning no residual solid acid catalyst (C) is left within the polyester, polyester resin or unsaturated polyester obtained by circulation through a column packed with the solid acid catalyst.

In a batch reactor, the polyhydric alcohol (D) and the polyvalent carboxylic acid (E) that act as the reaction raw materials are placed in the reactor, the reaction is conducted under stirring, and the product polyester or polyester resin or the like is removed from the reactor after a predetermined reaction time. Being a non-stationary operation, the composition inside the reactor changes with time. In the case of a slow reaction, if a high polyester conversion rate is required, then a batch reactor process is advantageous. A batch reactor can also be used favorably for small-scale production.

On the other hand, a circulating reactor employs a continuous circulating operation which minimizes material loss, provides a stable reaction state that enables the quality of the polyester, polyester resin or unsaturated polyester to be maintained at a certain level, and enables a reduction in production costs, and is therefore ideal as a process for producing a polyester resin in a continuous manner.

Of these types of reactors, the use of a fixed bed circulating reactor or circulating fluidized bed reactor, which requires no special operation for recovering the catalyst following completion of the reaction, is particularly desirable.

Examples of the polyhydric alcohol (D) used in the present invention include the types of aliphatic, alicyclic and aromatic polyhydric alcohols used in conventional polyester syntheses, and if necessary, monohydric alcohols may also be used. Specific examples include dihydric alcohols such as ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, 2-methyl-2-butyl-1,3-propanediol, 2,2,4-trimethyl-1,3-pentanediol, 2-ethyl-1,3-hexanediol, 2-methyl-1,8-octanediol, 1,9-nonanediol, 2,4-diethyl-1,5-pentanediol, 2-ethyl-2-butyl-1,3-propanediol, diethylene glycol, dipropylene glycol and triethylene glycol, as well as glycerol, trimethylolpropane, pentaerythritol and sorbitol and the like. Dihydric alcohols are mainly used as the polyhydric alcohol, and any one of these compounds may be used alone, or two or more compounds may be used in combination.

Examples of the polyvalent carboxylic acid (E) used in the present invention include the types of polybasic acids such as saturated dibasic acids and $\alpha,\beta$-unsaturated dibasic acids used in conventional polyester or unsaturated polyester syntheses, and if necessary, monobasic acids may also be used. Specific examples of saturated dibasic acids include dibasic acids such as oxalic acid, malonic acid, succinic acid, glutaric acid, adipic acid, pimelic acid, suberic acid, azelaic acid, sebacic acid, 1,12-dodecanedicarboxylic acid, phthalic anhydride, isophthalic acid, terephthalic acid, dimer acid, halogenated phthalic anhydrides, tetrahydrophthalic acid, tetrahydrophthalic anhydride, hexahydrophthalic acid, hexahydrophthalic anhydride, hexahydroterephthalic acid, hexahydroisophthalic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-biphenyldicarboxylic acid, and dialkyl esters thereof, as well as acid anhydrides of the above acids and polybasic acids such as pyromellitic acid. These polyvalent carboxylic acids may be used individually or in combinations of two or more different compounds. Specific examples of $\alpha,\beta$-unsaturated dibasic acids include maleic acid, maleic anhydride, fumaric acid, itaconic acid and itaconic anhydride. The amount of polyvalent carboxylic acid within an unsaturated polyester is preferably within a range from 30 to 50% by mass.

The ratio between the polyhydric alcohol (D) and the polyvalent carboxylic acid (E) used in the present invention is determined with due consideration of the number of functional groups within each compound, but is preferably an equivalence ratio within a range from 1:3 to 3:1, and more preferably from 1:2 to 2:1. This equivalence ratio may be selected appropriately in accordance with the target resin.

In the process for producing a polyester using the solid acid catalyst (C) of the present invention, the dehydration condensation of the polyvalent carboxylic acid (E) and the polyhydric alcohol (D) that represent the raw materials can be conducted, for example, by (1) a method in which the polyhydric alcohol (D) and the polyvalent carboxylic acid (E) are subjected to a condensation polymerization under normal pressure, (2) a method in which the two raw materials are subjected to a condensation polymerization under vacuum, and (3) a method in which a condensation polymerization is conducted in the presence of an inert solvent such as toluene, and the resulting condensation water and the solvent are subsequently removed from the reaction system by azeotropic distillation. The condensation polymerization reaction is preferably conducted under an atmosphere of an inert gas such as nitrogen, as this prevents coloration of the resulting polyester, polyester polyol or unsaturated polyester.

With the titanium-based and tin-based catalysts that are used as conventional homogeneous catalysts, the condensation polymerization reaction proceeds very poorly at reaction temperatures of 140° C. or lower, meaning reaction needs to be conducted at temperatures higher than 140° C.

However, the solid acid catalyst (C) of the present invention is capable of accelerating the condensation polymerization reaction even at low temperatures, for example 115° C. (see the examples), and because using the solid acid catalyst (C) of the present invention enables the esterification reaction to be conducted at a lower temperature than that conventionally possible, the present invention is very advantageous in an industrial setting from the perspective of energy conservation.

EXAMPLES

A more detailed description of the present invention is presented below using a series of examples and comparative examples, although the present invention is in no way limited to the examples presented below. In the examples and comparative example, unless stated otherwise, the units "parts" refer to "parts by mass".

Example 1

Production of Solid Acid Catalyst A

Using an incipient wetness method as the production method, and using 50 g of zirconium hydroxide ($Zr(OH)_4$, manufactured by Nippon Light Metal Co., Ltd.) that had been dried overnight at 100° C. and an aqueous solution (0.04 mol·dm$^{-3}$) prepared by dissolving the required amount of ammonium molybdate [$(NH_4)_6Mo_7O_{24}9 \cdot 4H_2O$ (manufactured by Kishida Chemical Co., Ltd.)] in pure water, an amount of the ammonium molybdate aqueous solution equivalent to the pore volume of the zirconium hydroxide was added gradually to uniformly wet the surface of the zirconium support, thus yielding a pre-calcination precursor. The concentration of the solution was adjusted so that the amount of supported molybdenum trioxide ($MoO_3$) was equivalent to a mass ratio of Mo/Zr=0.1. As a reaction pretreatment, calcination was conducted for 3 hours at 1,073 K under an atmosphere of oxygen. The product was left to cool naturally to room temperature, yielding a solid acid catalyst A.

Example 2

Preparation of Solid Acid Catalyst B

With the exception of altering the calcination temperature to 673 K, preparation was conducted in the same manner as example 1, yielding a solid acid catalyst B.

Example 3

Preparation of Solid Acid Catalyst C

With the exception of altering the calcination temperature to 773 K, preparation was conducted in the same manner as example 1, yielding a solid acid catalyst C.

Example 4

Preparation of Solid Acid Catalyst D

With the exception of altering the calcination temperature to 873 K, preparation was conducted in the same manner as example 1, yielding a solid acid catalyst D.

Example 5

Preparation of Solid Acid Catalyst E

With the exception of altering the calcination temperature to 973 K, preparation was conducted in the same manner as the solid acid catalyst A, yielding a solid acid catalyst E.

(Catalyst Properties)

<Method of Measuring $H_0$ Function by $NH_3$-TPD Measurement>

Measurement Method:

Samples of approximately 0.1 g (of the solid acid catalyst A and the solid catalyst B) were each set in the quartz cell (internal diameter: 10 mm) of a temperature programmed desorption apparatus TPD-AT-1 manufactured by BEL Japan, Inc., and the temperature was raised to 423 K (150° C.) at 5 K min$^{-1}$ under a stream of helium gas (30 cm$^3$ min$^{-1}$, 1 atm) and then held at 423 K for 3 hours. Subsequently, with the helium gas stream maintained, the temperature was raised to 373 K (100° C.) at 7.5 K min$^{-1}$, the system was subjected to vacuum degassing, 100 Torr (1 Torr=1/760 atm=133 Pa) of $NH_3$ was introduced and allowed to undergo adsorption for 30 minutes, and the system was then evacuated for 12 minutes and subsequently subjected to a steam treatment. In the steam treatment, steam having a steam pressure of approximately 25 Torr (approximately 3 kPa) was introduced at 373 K, the system was held in that state for 30 minutes, the system was evacuated for 30 minutes, steam was re-introduced for a further 30 minutes, and then an evacuation was repeated again for 30 minutes. Subsequently, helium gas was supplied to the system at a rate of 0.041 mmol s$^{-1}$ (equivalent to 60 cm$^3$ min$^{-1}$ at 298 K, 25° C. and 1 atm) while a state of reduced pressure (100 Torr) was maintained, and after maintaining this state for 30 minutes at 373 K, the sample bed was heated to 983 K (710° C.) at 10 K min$^{-1}$, and the evacuated gas was analyzed using a mass spectrometer (ANELVA M-QA 100F).

During measurement, mass spectra were recorded for mass values (m/e) of 2, 4, 14, 15, 16, 17, 18, 26, 27, 28, 29, 30, 31, 32 and 44. Following completion of the measurements, a 1 mol % $NH_3$/He standard gas was further diluted with helium, and gas samples having ammonia gas concentrations of 0, 0.1, 0.2, 0.3 and 0.4 mol % were passed through the detector with the total flow rate set to 0.041 mmol s$^{-1}$, spectra were recorded, and an ammonia gas calibration curved was prepared and used to correct the detector strength.

Figure 1:
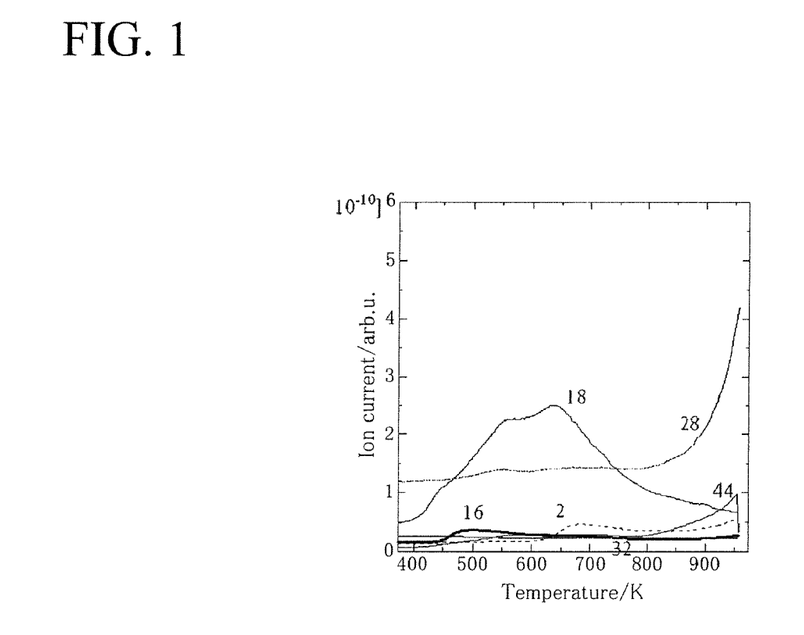
FIG. 1 is diagram illustrating the main mass spectra measured during temperature programmed desorption of the solid acid catalyst A, recorded using a mass spectrometer.
Figure 2:
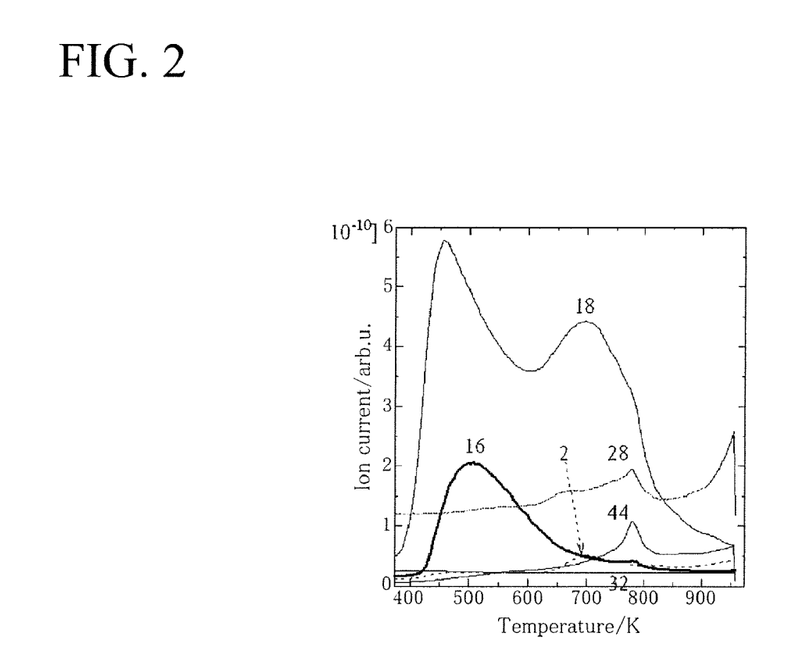
FIG. 2 is diagram illustrating the main mass spectra measured during temperature programmed desorption of the solid acid catalyst B, recorded using a mass spectrometer.

FIG. 1 and FIG. 2 show each of the main mass spectra measured during the temperature programmed desorption. The plots for other mass values (m/e) were essentially baselines, and no peaks were recorded.

In both samples, a peak was observed for m/e=16 in the vicinity of 500 K that represents ammonia desorption, and a small shoulder was also observed for m/e=16, at a temperature of greater than 900 K in the case of the solid acid catalyst A, and at a temperature in the vicinity of 780 K in the case of the solid acid catalyst B. However, because these high-temperature shoulders appear at approximately the same time as large peaks for m/e=44 (a $CO_2$ fragment) and m/e=28 (a $CO_2$ fragment), it is thought that these high-temperature shoulders are probably due to some form of $CO_2$ fragment, and are not due to ammonia. Accordingly, in the quantitative estimation of ammonia described below, these shoulder portions were excluded.

Figure 3:
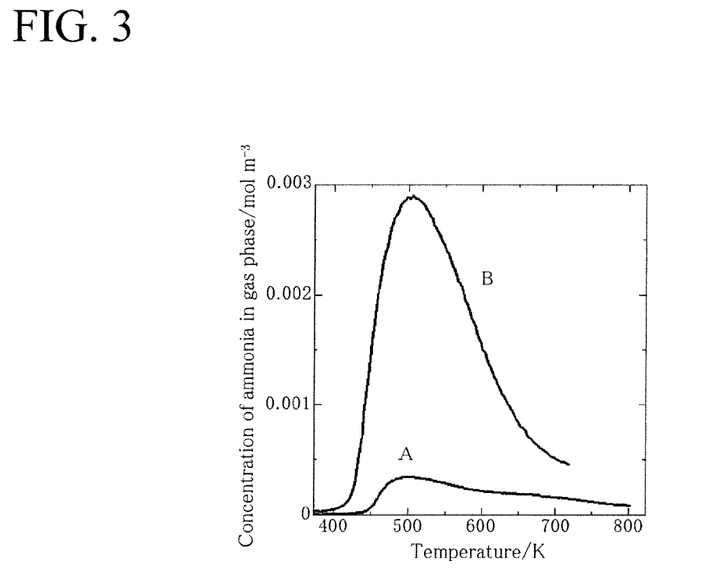
FIG. 3 illustrates ammonia TPD spectra for the solid acid catalysts A and B obtained using a temperature programmed desorption apparatus TPD-AT-1.

FIG. 3 illustrates ammonia TPD spectra calculated from the results for m/e=16. Values for the amount of acid and the acid strength (ΔH) were calculated from these spectra, and are shown below in Table 1.

Using a one-point method based on the actual measurement results, the amount of acid can be determined from the peak surface area, and the average acid strength can be determined from the peak position and the like. According to this method, the amount of acid per unit of mass of the solid acid catalyst A was approximately 0.03 mol kg$^{-1}$ and the amount of acid per unit of mass of the solid acid catalyst B was approximately 0.2 mol kg$^{-1}$, which suggests a significant difference, but the surface density (amount of acid/surface area) was within a range from approximately 0.4 to 0.7 nm$^{-2}$ for both the solid acid catalysts A and B. The average acid strength for the solid acid catalyst A was ΔH=133 kJ mol$^{-1}$, equivalent to an $H_0$ value of −7.4, whereas the average acid strength for the solid acid catalyst B was ΔH=116 kJ mol$^{-1}$, equivalent to a slightly weaker acid with an $H_0$ value of −4.4.

TABLE 1

| Catalyst | Peak | Peak temperature | Analysis method | Amount of acid mol kg$^{-1}$ | Specific surface area/m$^2$ g$^{-1}$ | Surface density of acid sites/nm$^{-2}$ | Ammonia heat of adsorption ΔH kJ mol$^{-1}$ | $H_0$ function |
|---|---|---|---|---|---|---|---|---|
| A | All | 509 | One-point method | 0.031 | 26.5 | 0.70 | Average 133 | −7.4 |
| B | All | 513 | One-point method | 0.201 | 252.6 | 0.48 | Average 116 | −4.4 |

(Measurement of Contact Angle Between Catalyst and Water Using Catalyst Wettability Test)

Test method: measurement apparatus: surface tensiometer K12 (manufactured by Krüss GmbH), using the powder wetting rate measurement option.

Measurement method: a sample of approximately 2.5 g was packed into a sample tube, and the penetration rate of a solvent was measured.

The factor was determined by assuming a contact angle of 0° for hexane, and the wetting rate for water was then used to measure the water contact angle (namely, Washburn's equation).

Catalyst: solid acid catalyst A—average particle size: 1 μm
solid acid catalyst B—average particle size: 1 μm
solid acid catalyst D—average particle size: 1 μm
The results are shown in Table 2.
Washburn's equation:

$$l = \sqrt{(r\gamma\cos\theta/2\eta)t}$$ [Numerical formula 2]

wherein l represents the penetration depth, r represents the capillary radius, η represents the viscosity, γ represents the liquid surface tension, θ represents the contact angle, and t represents the time.

TABLE 2

| Calcination temperature | Contact angle |
|---|---|
| 673 K | 78.4° |
| 873 K | 79.2° |
| 1,073 K | 86.5° |

(Relationship Between Catalyst Calcination Temperature and Conversion Rate)

Example 6

Synthesis of Polyester

A conical flask was charged with 24.5 parts by mass of 1,4-butanediol and 34.8 parts by mass of adipic acid, and 0.59 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 7

Synthesis of Polyester

A conical flask was charged with 24.5 parts by mass of 1,4-butanediol and 34.8 parts by mass of adipic acid, and 0.59 parts by mass of the solid acid catalyst B was added as a catalyst. The reaction was conducted with the flask immersed in a constant-temperature oil bath, with the reaction temperature held at 180° C., and was conducted by shaking the flask in a shaker under normal pressure conditions.

Example 8

Synthesis of Polyester

A conical flask was charged with 24.5 parts by mass of 1,4-butanediol and 34.8 parts by mass of adipic acid, and 0.59 parts by mass of the solid acid catalyst C was added as a catalyst. The reaction was conducted with the flask immersed in a constant-temperature oil bath, with the reaction temperature held at 180° C., and was conducted by shaking the flask in a shaker under normal pressure conditions.

Example 9

Synthesis of Polyester

A conical flask was charged with 24.5 parts by mass of 1,4-butanediol and 34.8 parts by mass of adipic acid, and 0.59 parts by mass of the solid acid catalyst D was added as a catalyst. The reaction was conducted with the flask immersed in a constant-temperature oil bath, with the reaction temperature held at 180° C., and was conducted by shaking the flask in a shaker under normal pressure conditions.

Example 10

Synthesis of Polyester

A conical flask was charged with 24.5 parts by mass of 1,4-butanediol and 34.8 parts by mass of adipic acid, and 0.59 parts by mass of the solid acid catalyst E was added as a catalyst. The reaction was conducted with the flask immersed in a constant-temperature oil bath, with the reaction temperature held at 180° C., and was conducted by shaking the flask in a shaker under normal pressure conditions.

The results of the above reactions are summarized in Table 3. It was evident that the polyester conversion rate was larger when the calcination temperature was within a range from 900 K to 1,100 K.

TABLE 3

| | Solid acid catalyst | Calcination temperature/K | Reaction temperature/° C. | Reaction time/hours | Conversion rate/% |
|---|---|---|---|---|---|
| Example 6 | A | 1073 | 180 | 1 | 66.47 |
| | | | | 2 | 89.8 |
| Example 7 | B | 673 | 180 | 1 | 52.07 |
| | | | | 2 | 75.16 |
| Example 8 | C | 773 | 180 | 1 | 45.4 |
| | | | | 2 | 67.44 |
| Example 9 | D | 873 | 180 | 1 | 50.03 |
| | | | | 2 | 73.02 |
| Example 10 | E | 973 | 180 | 1 | 59.12 |
| | | | | 2 | 81.8 |

Example 11

Synthesis of Polyester

A separable flask was charged with 82.28 parts by mass of 1,4-butanediol and 117.72 parts by mass of adipic acid, and 2.00 parts by mass of the solid acid catalyst A was added as a catalyst. The separable flask was sealed, and the reaction was conducted with the flask immersed in a constant-temperature oil bath, under conditions including a reaction temperature held at 180° C., a reduced pressure atmosphere of −95 kPa, and stirring at a rate of revolution of 300 rpm. Following completion of the synthesis, the resulting polyester was dissolved in a solvent (toluene) and filtered to isolate and recover the catalyst.

Example 12

Synthesis of Polyester

A separable flask was charged with 82.28 parts by mass of 1,4-butanediol and 117.72 parts by mass of adipic acid, and 2.00 parts by mass of the solid acid catalyst A was added as a catalyst. The separable flask was sealed, and the reaction was conducted with the flask immersed in a constant-temperature oil bath, under conditions including a reaction temperature held at 115° C., a reduced pressure atmosphere of −95 kPa, and stirring at a rate of revolution of 300 rpm.

Example 13

Synthesis of Polyester

A conical flask was charged with 28.1 parts by mass of 1,4-butanediol and 32.7 parts by mass of succinic acid, and 0.61 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 14

Synthesis of Polyester

A conical flask was charged with 20.6 parts by mass of 1,4-butanediol and 37.1 parts by mass of azelaic acid, and 0.58 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 15

Synthesis of Polyester

A conical flask was charged with 19.6 parts by mass of 1,4-butanediol and 37.7 parts by mass of sebacic acid, and 0.57 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 16

Synthesis of Polyester

A conical flask was charged with 17.9 parts by mass of 1,4-butanediol and 38.7 parts by mass of 1,12-dodecanedicarboxylic acid, and 0.57 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 17

Synthesis of Polyester

A conical flask was charged with 9.3 parts by mass of 1,4-butanediol and 43.7 parts by mass of dimer acid, and 0.53 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 18

Synthesis of Polyester

A conical flask was charged with 24.2 parts by mass of 1,4-butanediol and 35.0 parts by mass of phthalic anhydride, and 0.59 parts by mass of the solid acid catalyst A was added as a catalyst. The reaction was conducted with the flask immersed in a constant-temperature oil bath, with the reaction temperature held at 180° C., and was conducted by shaking the flask in a shaker under normal pressure conditions.

Example 19

Synthesis of Polyester

A conical flask was charged with 19.6 parts by mass of ethylene glycol and 41.1 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.61 parts of the solid acid catalyst A was added, the reaction was continued for a further 2 hours, and the reflux condenser was then removed.

Example 20

Synthesis of Polyester

A conical flask was charged with 28.1 parts by mass of 1,6-hexanediol and 30.1 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.58 parts of the solid acid catalyst A was added, the reaction was continued for a further 2 hours, and the reflux condenser was then removed.

Example 21

Synthesis of Polyester

A conical flask was charged with 26.4 parts by mass of neopentyl glycol and 32.3 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.59 parts by mass of the solid acid catalyst A was added, the reaction was continued for a further 2 hours, and the reflux condenser was then removed.

Example 22

Synthesis of Polyester

A conical flask was charged with 26.7 parts by mass of diethylene glycol and 32.0 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.59 parts by mass of the solid acid catalyst A was added, the reaction was continued for a further 2 hours, and the reflux condenser was then removed.

Example 23

Synthesis of Polyester

A conical flask was charged with 24.5 parts by mass of 2-methyl-1,3-propanediol and 34.8 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.59 parts by mass of the solid acid catalyst A was added, the reaction was continued for a further 2 hours, and the reflux condenser was then removed.

Example 24

Synthesis of Polyester

A conical flask was charged with 28.1 parts by mass of 3-methyl-1,5-pentanediol and 30.1 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.58 parts by mass of the solid acid catalyst A was added, the reaction was continued for a further 2 hours, and the reflux condenser was then removed.

Example 25

Synthesis of Polyester

A conical flask was charged with 22.2 parts by mass of 1,3-propylene glycol and 37.8 parts by mass of adipic acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.60 parts by mass of the solid acid catalyst A was added, the reaction was continued for a further 2 hours, and the reflux condenser was then removed.

Example 26

Synthesis of Polyester

A conical flask was charged with 26.5 parts by mass of diethylene glycol and 32.1 parts by mass of phthalic anhydride, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.53 parts by mass of the solid acid catalyst A was added, the reaction was continued for a further 2 hours, and the reflux condenser was then removed.

Example 27

Synthesis of Polyester

A conical flask was charged with 9.3 parts by mass of 2-methyl-1,3-propanediol and 43.7 parts by mass of dimer acid, a reflux condenser was fitted, and reaction was conducted with the flask immersed in a constant-temperature oil bath, with the reaction temperature held at 180° C., by shaking the flask in a shaker under normal pressure conditions. 3.5 hours after commencing the reaction, 0.53 parts by mass of the solid acid catalyst A was added, the reaction was continued for a further 2 hours, and the reflux condenser was then removed.

Example 28

Synthesis of Unsaturated Polyester

A 5 L SUS kettle was charged with 431.50 parts by mass of diethylene glycol, 231.8 parts by mass of terephthalic acid, 85.0 parts by mass of adipic acid, and 12.7 parts by mass of the solid acid catalyst A, and with nitrogen gas blown into the kettle from a nitrogen inlet tube, the temperature was raised to 215° C. and reaction was conducted for 12 hours. During the reaction, the acid number was tracked every 2 hours, and following confirmation that the acid number had fallen to a value of not more than 3, the reaction mixture was cooled to 150° C., 137.7 parts by mass of phthalic anhydride and 114.1 parts by mass of maleic anhydride were added, and the temperature was then increased again to 205° C., and reaction was continued for a further 9 hours. Following confirmation that the acid number had fallen to not more than 33, 30 ppm of toluhydroquinone and 10 ppm of copper naphthenate were added, and the product was diluted with styrene to obtain a liquid resin with a non-volatile fraction of 60%.

The above results are summarized below in Table 4. The results confirmed that the catalyst of the present invention was able to act as a catalyst for polyester production regardless of the nature of the polyhydric alcohol and the polybasic acid.

TABLE 4

|  | Glycol component | Acid component | Reaction temperature/° C. | Reaction time/hours | Conversion rate/% |
|---|---|---|---|---|---|
| Example 11 | 1,4-BG | Adipic acid | 180 | 16 | 99.88 |
| Example 12 | 1,4-BG | Adipic acid | 115 | 17 | 99.68 |
| Example 13 | 1,4-BG | Succinic acid | 180 | 3 | 98.84 |
| Example 14 | 1,4-BG | Azelaic acid | 180 | 3 | 98.78 |
| Example 15 | 1,4-BG | Sebacic acid | 180 | 3 | 97.17 |
| Example 16 | 1,4-BG | Dodecanedicarboxylic acid | 180 | 3 | 96.56 |
| Example 17 | 1,4-BG | Dimer acid | 180 | 3 | 95.89 |
| Example 18 | 1,4-BG | Phthalic anhydride | 180 | 3 | 76.86 |
| Example 19 | Ethylene glycol | Adipic acid | 180 | 8.5 | 94.79 |
| Example 20 | 1,6-hexanediol | Adipic acid | 180 | 8.5 | 99.84 |
| Example 21 | Neopentyl glycol | Adipic acid | 180 | 8.5 | 94.19 |
| Example 22 | Diethylene glycol | Adipic acid | 180 | 8.5 | 91.28 |
| Example 23 | 2-methyl-1,3-propanediol | Adipic acid | 180 | 8.5 | 98.16 |
| Example 24 | 3-methyl-1,5-pentanediol | Adipic acid | 180 | 8.5 | 99.71 |
| Example 25 | 1,3-propylene glycol | Adipic acid | 180 | 8.5 | 82.22 |
| Example 26 | Diethylene glycol | Phthalic anhydride | 180 | 8.5 | 75.95 |
| Example 27 | 2-methyl-1,3-propanediol | Dimer acid | 180 | 8.5 | 90.7 |

Example 29

Reaction Rate Kinetic Analysis and Estimation of Polyesterification Reaction Mechanism A conical flask was charged with 15.45 parts by mass of 1,4-butanediol and 29.4 parts by mass of adipic acid, 0.45 parts of the solid acid catalyst A was added as a catalyst, a reflux condenser was fitted, and reaction was conducted with the flask immersed in a constant-temperature oil bath, with the reaction temperature held at 180° C., by shaking the flask in a shaker under normal pressure conditions. The small amount of reaction mixture was taken from the flask every 1 hour during the reaction, and those acid number were measured.

Example 30

Reaction Rate Kinetic Analysis and Estimation of Polyesterification Reaction Mechanism A conical flask was charged with 20.6 parts by mass of 1,4-butanediol and 29.4 parts by mass of adipic acid, 0.50 parts of the solid acid catalyst A was added as a catalyst, a reflux condenser was fitted, and reaction was conducted with the flask immersed in a constant-temperature oil bath, with the reaction temperature held at 180° C., by shaking the flask in a shaker under normal pressure conditions. The reaction mixture was sampled after each 1 hour of reaction, and the acid number was measured.

Example 31

Reaction Rate Kinetic Analysis and Estimation of Polyesterification Reaction Mechanism A conical flask was charged with 25.75 parts by mass of 1,4-butanediol and 29.4 parts by mass of adipic acid, 0.55 parts of the solid acid catalyst A was added as a catalyst, a reflux condenser was fitted, and reaction was conducted with the flask immersed in a constant-temperature oil bath, with the reaction temperature held at 180° C., by shaking the flask in a shaker under normal pressure conditions. The reaction mixture was sampled after each 1 hour of reaction, and the acid number was measured.

Example 32

Reaction Rate Kinetic Analysis and Estimation of Polyesterification Reaction Mechanism A conical flask was charged with 20.6 parts by mass of 1,4-butanediol and 36.75 parts by mass of adipic acid, 0.57 parts of the solid acid catalyst A was added as a catalyst, a reflux condenser was fitted, and reaction was conducted with the flask immersed in a constant-temperature oil bath, with the reaction temperature held at 180° C., by shaking the flask in a shaker under normal pressure conditions. The reaction mixture was sampled after each 1 hour of reaction, and the acid number was measured.

Example 33

Reaction Rate Kinetic Analysis and Estimation of Polyesterification Reaction Mechanism A conical flask was charged with 20.6 parts by mass of 1,4-butanediol and 22.05 parts by mass of adipic acid, 0.43 parts of the solid acid catalyst A was added as a catalyst, a reflux condenser was fitted, and reaction was conducted with the flask immersed in a constant-temperature oil bath, with the reaction temperature held at 180° C., by shaking the flask in a shaker under normal pressure conditions. The reaction mixture was sampled after each 1 hour of reaction, and the acid number was measured.

Figure 4:
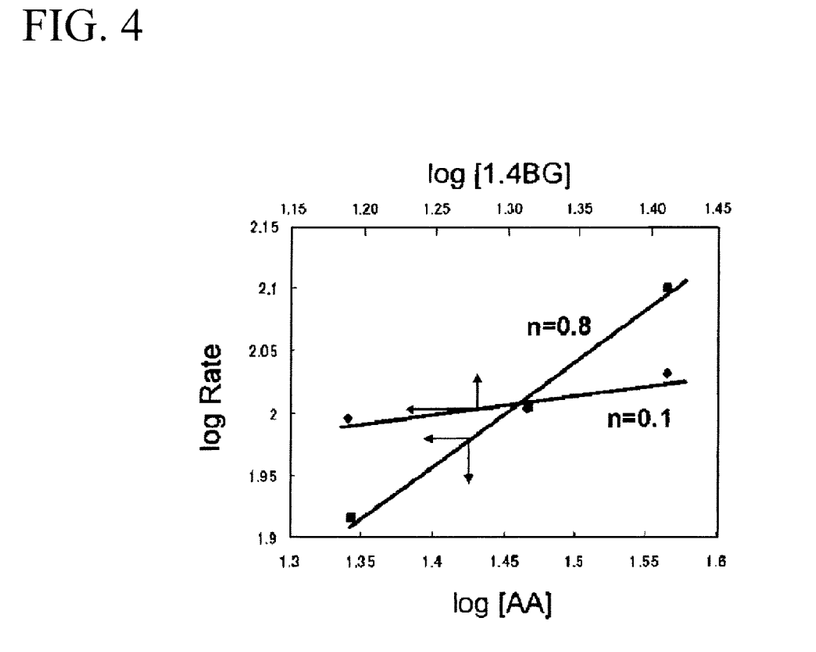
FIG. 4 is a graph illustrating the dependency of the reaction rate on the concentration levels of the raw materials (polyvalent carboxylic acid and polyhydric alcohol).

From the results of examples 29 to 33 described above, the reaction rate was calculated for the low conversion rate region, and the dependency of the reaction rate on the raw material concentration levels was investigated (see FIG. 4). From the results obtained, the reaction rate for the polyesterification reaction of 1,4-butanediol (1,4BG) and adipic acid (AA) on the solid acid catalyst A can be estimated by the equation shown below.

$$\text{Rate} = k[1,4BG]^{0.1}[AA]^{0.8}$$

The reaction rate equation in the absence of a catalyst is represented by the formula below.

$$\text{Rate} = k[1,4BG]^{1}[AA]^{1}$$

The fact that, in the catalytic system, the reaction order for 1,4 GB changes from 1 →0.1 indicates that 1,4 GB is being adsorbed readily to the catalytically active sites, whereas the fact that the reaction order for AA changes from 1→0.8 indicates that AA is less likely to undergo adsorption. The reaction order changes to a decimal point value, and it is thought that this indicates that the esterification reaction is proceeding both at the catalyst surface and away from the catalyst surface, with the reaction order being calculated as a combination of both situations. Furthermore, it is clear from these reaction orders that 1,4 GB adsorbs strongly to the catalyst surface.

Figure 5:
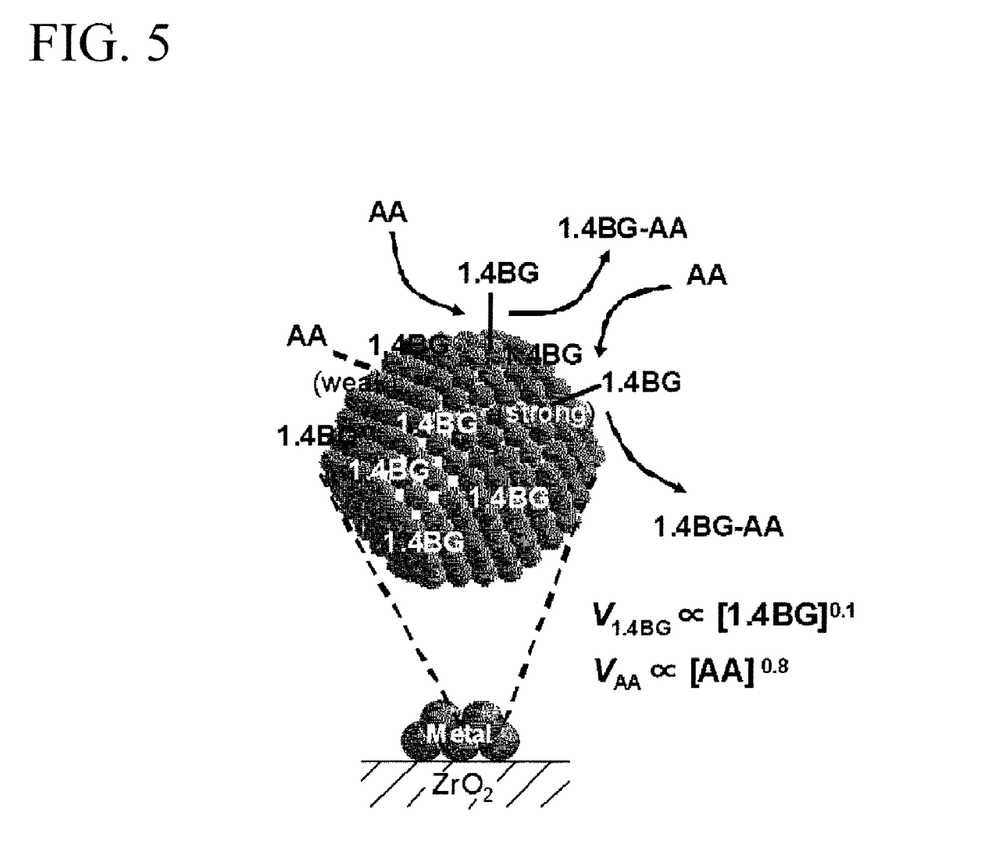
FIG. 5 is a schematic illustration of the esterification reaction mechanism.

Accordingly, the esterification reaction mechanism within this catalytic system is surmised to first involve dissociative adsorption of the 1,4 GB to the active sites on the catalyst surface, followed by the AA making contact with the active sites and undergoing reaction, thus causing the esterification reaction to proceed. A schematic illustration of the esterification reaction mechanism is shown in FIG. 5.

Comparative Example 1

Synthesis of Polyester

A conical flask was charged with 24.5 parts by mass of 1,4-butanediol and 34.8 parts by mass of adipic acid, and 0.59 parts by mass of zirconia sulfate (hereafter referred to as $SO_4^{2-}/ZrO_2$, lot No. G18088, manufactured by Daiichi Kigenso Kagaku Kogyo Co., Ltd.) was added as a catalyst. The reaction was conducted with the flask immersed in a constant-temperature oil bath, with the reaction temperature held at 180° C., and was conducted by shaking the flask in a shaker under normal pressure conditions. The acid strength of this $SO_4^{2-}/ZrO_2$, when represented by the Hammett acidity function $H_0$, was $H_0=-11.93$, indicating a so-called solid superacid.

Comparative Example 2

Synthesis of Polyester

A separable flask was charged with 82.28 parts by mass of 1,4-butanediol and 117.72 parts by mass of adipic acid, and 0.04 parts by mass of $Ti(OC_3H_7)_4$ was added. The separable flask was sealed, and the reaction was conducted with the flask immersed in a constant-temperature oil bath, under conditions including a reaction temperature held at 180° C., a reduced pressure atmosphere of −95 kPa, and stirring at a rate of revolution of 300 rpm.

Comparative Example 3

Synthesis of Polyester

A separable flask was charged with 82.28 parts by mass of 1,4-butanediol and 117.72 parts by mass of adipic acid, and 0.04 parts by mass of $Ti(OC_3H_7)_4$ was added. The separable flask was sealed, and the reaction was conducted with the flask immersed in a constant-temperature oil bath, under conditions including a reaction temperature held at 115° C., a reduced pressure atmosphere of −95 kPa, and stirring at a rate of revolution of 300 rpm.

Comparative Example 4

Synthesis of Polyester

A conical flask was charged with 24.5 parts by mass of 1,4-butanediol and 34.8 parts by mass of adipic acid, and without adding any catalyst, the reaction was conducted with the flask immersed in a constant-temperature oil bath, with the reaction temperature held at 115° C., and was conducted by shaking the flask in a shaker under normal pressure conditions.

The results of the comparative examples, in which polyesters were produced using existing catalysts, are summarized in Table 6. As is evident from comparative example 3, with an existing titanium-based catalyst, or with no catalyst, generation of the polyester resin does not proceed at a reaction temperature of 115° C.

TABLE 5

|  | Catalyst | Glycol and acid components | Reaction temperature/° C. | Reaction time/hours | Conversion rate/% |
| --- | --- | --- | --- | --- | --- |
| Comparative example 1 | $SO_4^{2-}/ZrO_2$ | 1,4-BG adipic acid | 180 | 5 | 94.59 |
| Comparative example 2 | $Ti(OC_3H_7)_4$ | 1,4-BG adipic acid | 180 | 16 | 99.92 |
| Comparative example 3 | $Ti(OC_3H_7)_4$ | 1,4-BG adipic acid | 115 | 16 | NR |
| Comparative example 4 | No catalyst | 1,4-BG adipic acid | 115 | 12 | NR |

Amongst the examples and comparative examples are some cases in which the reaction did not proceed fully, but this is simply because the reaction was stopped partway through, and does not indicate a particular problem.

(Analysis of Side Reaction By-products)

The polyesters synthesized using the solid acid catalysts were investigated for side reaction by-products and residual catalyst. Analysis of side reactions was conducted by quantifying the amounts of by-products and residual catalyst for the polyesters synthesized in examples 6 to 12 and comparative example 1. The results are shown in the following table.

Conversion rate(%)=(acid number after reaction/acid number before reaction)×100

By-product(mol %)=(mol % of each by-product when amount of glycol is deemed 100)

[Quantitative Determination of Residual Catalyst Contained within Polyester]

The amount of residual catalyst within the polyesters synthesized in example 11 and comparative example 2 was quantified using an X-ray fluorescence spectrometer. The results are shown in Table 6.

TABLE 6

| | Reaction time/hours | By-product/mol % | | | | | Residual catalyst/ppm |
| --- | --- | --- | --- | --- | --- | --- | --- |
| | | Aldehyde | Acid | Double bond | Ether | C—C bond cleavage | |
| Example 6 | 1 | — | — | — | — | — | — |
| | 2 | below limit of detection | below limit of detection | below limit of detection | below limit of detection | below limit of detection | — |
| Example 7 | 1 | — | — | — | — | — | — |
| | 2 | below limit of detection | below limit of detection | below limit of detection | below limit of detection | below limit of detection | — |
| Example 8 | 1 | — | — | — | — | — | — |
| | 2 | below limit of detection | below limit of detection | below limit of detection | below limit of detection | below limit of detection | — |
| Example 9 | 1 | — | — | — | — | — | — |
| | 2 | below limit of detection | below limit of detection | below limit of detection | below limit of detection | below limit of detection | — |
| Example 10 | 1 | — | — | — | — | — | — |
| | 2 | below limit of detection | below limit of detection | below limit of detection | below limit of detection | below limit of detection | — |
| Example 11 | 16 | below limit of detection | below limit of detection | below limit of detection | below limit of detection | below limit of detection | below limit of detection |
| Example 12 | 17 | below limit of detection | below limit of detection | below limit of detection | below limit of detection | below limit of detection | — |
| Comparative example 1 | 5 | below limit of detection | below limit of detection | below limit of detection | 0.174 | below limit of detection | — |
| Comparative example 2 | 16 | — | — | — | — | — | 200 |
| Comparative example 3 | 16 | — | — | — | — | — | 200 |
| Comparative example 4 | 12 | — | — | — | — | — | 0 |

Analysis of the side reactions was conducted by calculating the "conversion ratio (%)" and the "by-product (mol %)" values using the formulas below, based on the product composition values determined from the results of NMR and GC-MS analyses and the starting material amounts. Examples of possible by-product reactions include the production of aldehydes or acids via oxidation reactions of the glycol, the production of double bonds via intramolecular dehydration of the glycol, subsequent etherification reactions of such double bonds with the glycol, and carbon-carbon bond cleavage reactions. The amount of each of these by-products was investigated. The analysis was conducted by performing NMR measurements. Carbon-carbon bond cleavage reactions were evaluated by measuring terminal $CH_3$ groups in the resulting products. GC-MS analysis was conducted by subjecting each of the synthesized polyesters to decomposition in alkali, and then investigating whether or not any compounds other than the raw material glycol and acid appear in the decomposition product.

<Evaluation of Results>

The results for the examples and comparative examples recorded in Table 6 above enable confirmation of the following points.

(1) The catalyst of the present invention exhibits an extremely favorable polyester selectivity ratio of at least 99.9% (with by-products being below the limits of detection). Further, although the reaction rate is not as high as that of conventional acid catalysts, because the catalyst of the present invention can be filtered and reused even when employed in large amounts, this slight drawback can be covered, and a metal-free polyester can be synthesized.

(2) The solid acid catalyst of the present invention has an acid strength which, when expressed using the $H_0$ function, satisfies $H_0 = -3$ to $-9$.

(3) The contact angle with water for the solid acid catalyst of the present invention is within a range from 70 to 90°.

(4) The calcination temperature correlates with the wettability of the catalyst, and it is clear that this also affects the catalytic activity. The reaction rate is optimal for a calcination temperature in the vicinity of 900 to 1,100 K.

(5) Compared with currently used titanium-based homogeneous catalysts, the catalyst of the present invention enables polyesters to be synthesized at lower temperatures.

DESCRIPTION OF THE REFERENCE SYMBOLS

A: Solid acid catalyst A
B: Solid acid catalyst B

The invention claimed is:

1. A solid acid catalyst for production of a polyester, wherein said solid acid catalyst is produced by supporting a metal oxide (B) on a support (A) formed from a metal oxide, and
said support (A) formed from a metal oxide is a zirconia, said metal oxide (B) is a molybdenum oxide, and a Hammett acidity function ($H_o$) for said catalyst is within a range from −3 to −9.

2. A solid acid catalyst for production of a polyester according to claim 1, wherein a contact angle with water (measured using a penetration rate method) is within a range from 30° to 110°.

3. A solid acid catalyst for production of a polyester according to claim 1, wherein said metal oxide (B) is a molybdenum oxide that comprises zirconium.

4. A solid acid catalyst for production of a polyester according to claim 3, wherein said molybdenum oxide that comprises zirconium is zirconia molybdate.

5. A process for producing a polyester that uses a solid acid catalyst for production of a polyester according to any one of claims 1 to 4.

6. A process for producing a polyester, comprising:
reacting a polyhydric alcohol (D) and a polyvalent carboxylic acid (E) using a fixed bed circulating reactor containing a solid acid catalyst for production of a polyester according to any one of claims 1 to 4.

7. A process for producing a polyester, comprising:
reacting a polyhydric alcohol (D) and a polyvalent carboxylic acid (E) using a circulating fluidized bed reactor containing a solid acid catalyst for production of a polyester according to any one of claims 1 to 4.

8. A process for producing a polyester, comprising:
reacting a polyhydric alcohol (D) and a polyvalent carboxylic acid (E) using a batch reactor containing a solid acid catalyst for production of a polyester according to any one of claims 1 to 4.

9. A process for producing an unsaturated polyester that uses a solid acid catalyst for production of a polyester according to any one of claims 1 to 4.

10. A solid acid catalyst for production of a polyester according to claim 2, wherein said metal oxide (B) is a molybdenum oxide that comprises zirconium.

* * * * *